Oct. 30, 1962     W. A. PLEDGER     3,060,833
DAMPER DEVICE FOR RANGES
Filed Dec. 4, 1958     2 Sheets-Sheet 1
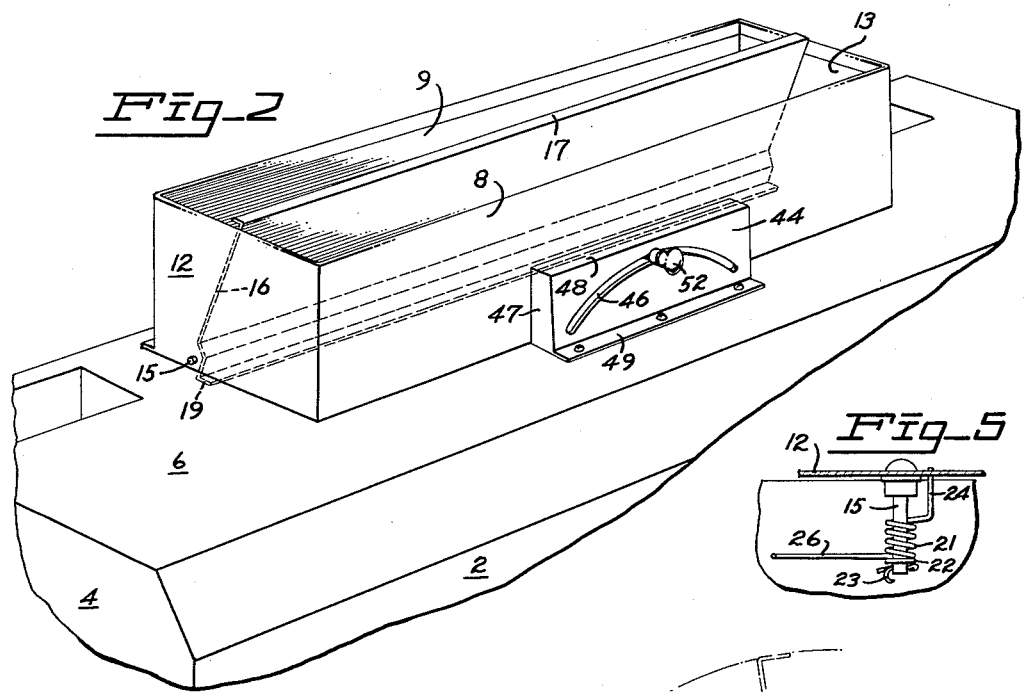
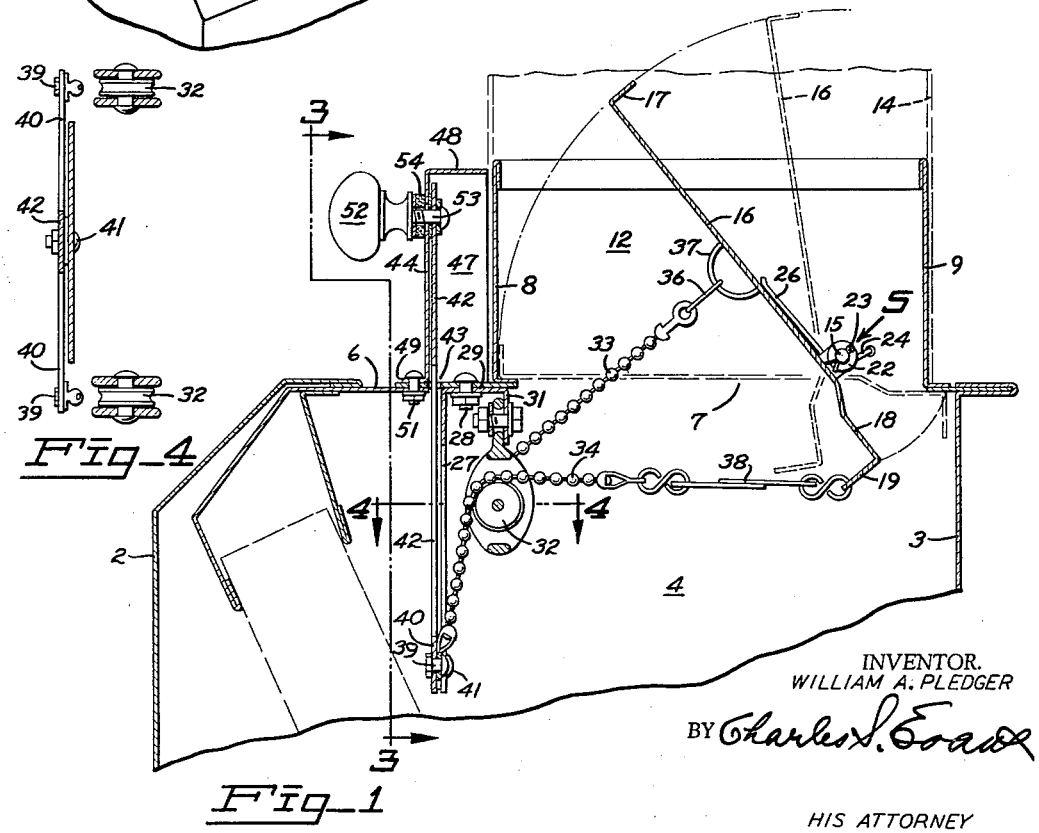
INVENTOR.
WILLIAM A. PLEDGER
BY Charles L. Evans
HIS ATTORNEY Oct. 30, 1962     W. A. PLEDGER     3,060,833
DAMPER DEVICE FOR RANGES
Filed Dec. 4, 1958     2 Sheets-Sheet 2
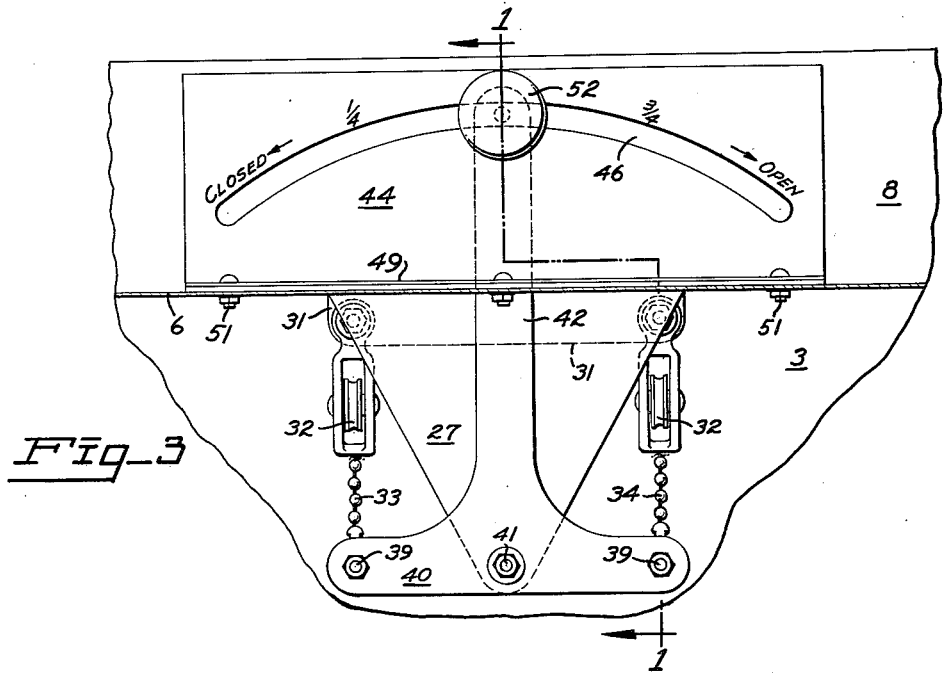
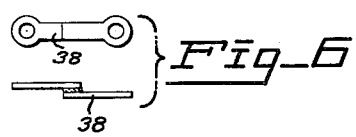
INVENTOR.
WILLIAM A. PLEDGER
BY Charles S. Evans
HIS ATTORNEY ３,060,833
DAMPER DEVICE FOR RANGES
William A. Pledger, Los Altos, Calif., assignor, by mesne assignments, to Pledger-Cockle Sales Co., Inc., a corporation of Ohio
Filed Dec. 4, 1958, Ser. No. 778,107
2 Claims. (Cl. 98—115)

My invention relates to damping mechanisms, and particularly to a damper device for kitchen range hoods, canopies or ventilators.

One of the objects of my invention is the provision of a damping device which may be easily and quickly adjusted to control the flow of air passing through a ventilating system in which my device is installed.

Another object of my invention is the provision of a damper device secure from fluttering movement resulting from air flowing therepast.

Still another object of my invention is the provision of a damper device incorporating heat sensitive fuse means to effect closing of the damper when the heat reaches a predetermined temperature.

A still further object of the invention is the provision of means for resiliently retaining the damper in closed position after the heat sensitive fuse has ruptured.

The invention possesses other objects and features of value, some of which with the foregoing will be brought out in the following description of the invention. I do not limit myself to the showing made by the said description and the drawings since I may adopt variant forms of the invention within the scope of the appended claims.

Referring to the drawings:

FIG. 1 is a vertical sectional view taken in the plane indicated by the line 1—1 in FIG. 3.

FIG. 2 is a perspective view showing the damper device installed over the outlet opening of a range hood or canopy.

FIG. 3 is a fragmentary vertical sectional view taken in the plane indicated by the line 3—3 of FIG. 1.

FIG. 4 is a horizontal sectional view taken in the plane indicated by the line 4—4 in FIG. 1.

FIG. 5 is a fragmentary detail view taken in the direction indicated by the arrow 5 in FIG. 1.

FIG. 6 is a view showing the heat sensitive fuse link used in the device of FIG. 1.

All of the views are drawn to a scale approximately one-half actual size.

Broadly considered, the damper device of my invention comprises a housing adapted to fit closely over the exhaust outlet of a range hood or canopy and between such outlet and the duct which channels products of combustion to the atmosphere. Within the housing is mounted a damper plate, pivotally adjustable to vary the effective cross-sectional area of the passage defined by the housing to control the volume of air or products of combustion passing through the system. The damper plate is operatively connected with damper control means outside the housing which provide a ready means of selectively adjusting the position of the damper within the housing. Means are provided within the housing to effect closing of the damper plate when the heat within the system reaches a predetermined temperature. Such means comprises a heat sensitive fuse link interposed between the damper plate and the damper control means and gauged to rupture when said predetermined temperature is reached.

More specifically, the damper device of my invention comprises a sheet metal housing 8, 9, 12, 13 formed to fit snugly over the exhaust outlet of a range hood or canopy so that air and produces of combustion pass through the housing to reach the atmosphere. The hood or canopy is formed with a hollow base portion having a front wall 2, back wall 3, side walls 4, and a top wall 6 having an exhaust opening 7 therein. The bottom of the housing is left open for communication with the exhaust outlet of the range hood or canopy.

The opening 7 in top wall 6 of the hood communicates with the hollow interior chamber formed by the housing attached to the top wall 6 about the opening 7. The housing is formed by front and back walls 8 and 9 respectively, and by end walls 12 and 13. The housing is adapted to fit snugly into the open bottom end of a duct 14, here shown in dash lines, which functions to carry air and products of combustion away from the range for delivery into the atmosphere.

Means are provided within the housing adjustable to control the passage of air and products of combustion therethrough. Pivotally mounted within the housing on pivot pins 15 supported on the side or end walls 12 and 13, is a metal damper plate 16 provided at its forward edge with a flange 17, and provided adjacent its rear edge with a portion 18 offset from the plane of the main damper portion and terminating in a flange 19 at the rear edge of the damper plate. The edge flanges 17 and 19 lend rigidity to the relatively long edges of the plate, helpful in maintaining flat edge portions for sealing the opening 7 when the damper plate is closed. As seen best in FIG. 5, a coil spring 21 secured on one of the pivot pins 15 by a washer 22 and a cotterpin 23, has one end 24 anchored in the housing wall 12 and the other end 26 impinging against the damper plate at a point spaced from the pivotal axis of the plate. The relationship of the spring ends 24 and 26 is such as to resiliently press the damper plate toward a closed position.

Means are provided operatively connected with the damper plate to adjust its position within the housing to control the passage of air therepast. Fixed to the top wall 6 within the lower housing portion and depending thereinto is a journal plate 27. In the embodiment of the invention shown in FIG. 1, the journal plate is detachably secured by bolts 28 passing through wall 6 and a right angle base flange 29 on the journal plate. A reentrant flange 31 integral with the flange 29 serves to support a pair of depending pulley wheels 32, secured to the flange 31 in spaced relation as shown in FIGS. 3 and 4.

As shown in FIG. 1, the pulleys provide an intermediate support and effect a change of direction in the flexible ties or chains 33 and 34, each of which at one end is secured to the damper plate on opposite sides of the pivotal axis from the other. The connection of chain 33 to the damper plate is effected by a link 36 fixed at one end to the chain and at its other end slidably engaging a semi-circular wire loop 37 having its ends brazed or otherwise fixed to the underside of the damper plate. The other chain 34 is connected to the damper by a heat sensitive fuse link 38 having one end linked to the flange 19 and its other end connected to the end of chain 34. As shown best in FIG. 8, the fuse link is of conventional bipartite construction with the parts fused together by solder having a predetermined melting point.

The opposite ends of chains 33 and 34 are connected by bolts 39 to the ends of a horizontal cross bar 40 pivoted by cap screw 41 adjacent the lower end of the journal plate 27. A vertical control lever 42 integral with the cross bar intermediate the ends thereof, extends upwardly through a slot 43 in the upper wall 6 and terminates behind a control plate 44 having an arcuate slot 46 in the face thereof. The control plate is provided with end flanges 47 and a top flange 48 to provide rigidity, and a flange 49 along its bottom edge serves to attach the housing to the wall 6 by means of cap screws 51. A knob 52 threaded on a headed screw 53 extending through the upper end portion of the control lever and through the slot 46, is adjustable from outside the housing to either clamp the control lever to the control plate or release the control lever and move it from side to side. A fibre washer 54 caught between the knob and the control plate insures that the control lever will remain in whatever position it is clamped. Indicia on the face of the plate alongside the slot 46 correlates a selected position of the control lever with a desired position of the damper plate within the housing.

In the embodiment illustrated in FIGS. 1 and 3, movement of the control lever toward the left will apply tension to chain 33 and pull the damper plate toward a closed position. Movement of the control lever to the right will apply tension to chain 34 and the damper will move toward a more open position against the tension of spring 21.

From the foregoing it will be seen that the damper plate may be readily and selectively adjusted to any desired position between fully closed and fully open by manipulation of the cotnrol lever. In commercial installations, the draft through the range ventilating system is usually a forced draft created by an electric motor-operated blower operatively connected with the duct 14. In this type of an installation, use of my controlled damper is particularly advantageous because it permits use of a single constant speed motor for the blower over a wide range of air volume requirements, instead of differently rated multi-speed motors and blowers, thus reducing initial cost. Since the volume of air moved by the blower determines in large part the power consumption of the motor, my damper control is useful to control the volume of air flowing within close limits determined by the need for more or less draft through the system during peak cooking periods, thus effectively controlling the power consumption of the motor.

In the event an uncontrollable fire occurs within the system which is likely to be sucked up past the damper and into the duct, the excesive heat generated by the fire causes the heat sensitive fuse link to rupture, which permits gravity and coil spring 21 to quickly pivot the damper plate into closed position. The spring 21 serves to retain the damper plate closed against the pressure of air within the system. Where desired, closing of the damper plate either selectively or by reason of rupture of the fuse link, may be accompanied by automatic opening of a switch (not shown) in the blower motor circuit to stop the blower and thus stop completely the passage of air past the damper.

I claim:

1. A damper device for an exhaust hood, canopy, ventilator or the like, said exhaust hood, canopy, ventilator or the like being adapted to be mounted over a kitchen range or stove and comprising a hollow housing open at its top and bottom, said open top constituting an exhaust opening to the atmosphere, a damper plate, pivots on which said damper plate is mounted intermediate the top and bottom edges thereof within the housing and adjustable between a fully open and closed position of said housing to control the volume of air flowing therethrough, said damper plate being normally spring-pressed in a housing-closing direction, control means comprising a lever having a cross bar at its lower end, said lever being pivotally mounted at said lower end within the exhaust hood, canopy, ventilator or the like with the other end extending outside thereof, means including a control plate secured to the front of the housing and having an arcuate slot therein, said means engaging said other end of said lever and permitting selective movement of said other end of said lever between fixed limits corresponding to the fully open and closed positions of the damper plate, flexible means connecting one end of said cross bar to said damper plate above the pivots therefor and connecting the other end of said cross bar to said damper plate below said pivots whereby to effect movement of said damper plate in correlation to movement of the lever, means associated with said other end of said lever outside said housing for locking said lever and consequently said damper plate in a selected position of adjustment against the force exerted by the spring, and a heat sensitive fuse link in said flexible means to permit closing of the damper plate by the spring upon rupture of the fuse link when the heat in the housing reaches a predetermined temperature, said flexible means including a chain without a fuse link connecting said one end of said cross bar with said damper plate above the pivots arranged to move said damper plate toward closed position, whereby to restrict movement of the damper plate in an opening direction beyond its previously adjusted position after rupture of said fuse link.

2. The combination according to claim 1, in which the damper plate is pivotally mounted for adjustment between a fully open and closed condition about an axis perpendicular to the longitudinal axis of said hollow housing, in which said lever is pivotally mounted about an axis perpendicular to the longitudinal axis of said hollow housing and to the axis of rotation of said damper plate, and including a pair of pulley guide means through each of which one of said flexible means passes, the axes of said pulley wheels being parallel to the axis on which damper plate is mounted.

References Cited in the file of this patent

UNITED STATES PATENTS

| | | |
|---|---|---|
| 3,492 | Woolley | Mar. 16, 1844 |
| 548,889 | Ripley | Oct. 29, 1895 |
| 1,009,769 | McGinness | Nov. 28, 1911 |
| 1,125,416 | Watson | Jan. 19, 1915 |
| 1,352,255 | Emerson | Sept. 7, 1920 |
| 1,898,821 | Ewald | Feb. 21, 1933 |
| 2,242,738 | Alton | May 20, 1941 |
| 2,270,073 | Merry | Jan. 13, 1942 |
| 2,702,504 | Guildford | Feb. 22, 1955 |
| 2,813,477 | Gaylord | Nov. 19, 1957 |
| 2,832,277 | Simons | Apr. 29, 1958 |